(12) United States Patent
Wiggins

(10) Patent No.: US 6,968,940 B2
(45) Date of Patent: Nov. 29, 2005

(54) UNIVERSAL MOUNT FOR A CLEANING BLADE FOR A CONVEYING BELT

(75) Inventor: Daniel Wiggins, Marquette, MI (US)

(73) Assignee: Argonics, Inc., Marquette, MI (US)

( * ) Notice: Subject to any disclaimer, the term of this patent is extended or adjusted under 35 U.S.C. 154(b) by 0 days.

(21) Appl. No.: 10/736,878

(22) Filed: Dec. 16, 2003

(65) Prior Publication Data

US 2005/0126889 A1    Jun. 16, 2005

(51) Int. Cl.$^7$ ............................................. B65G 45/00
(52) U.S. Cl. ..................................................... 198/497
(58) Field of Search ............................... 198/497, 498, 198/499

(56) References Cited

U.S. PATENT DOCUMENTS

| | | |
|---|---|---|
| 4,598,823 A | 7/1986 | Swinderman |
| 4,779,716 A * | 10/1988 | Gordon ....................... 198/497 |
| 4,953,689 A | 9/1990 | Peterson et al. |
| 5,114,000 A | 5/1992 | Rappen |
| 5,197,587 A | 3/1993 | Malmberg |
| 5,826,700 A | 10/1998 | Brink |
| 5,944,167 A | 8/1999 | Brink |
| 6,354,428 B1 | 3/2002 | Gibbs et al. |

* cited by examiner

Primary Examiner—Joe Dillon, Jr.
(74) Attorney, Agent, or Firm—Wood, Phillips, Katz, Clark & Mortimer

(57) ABSTRACT

A mounting system for a cleaning blade for a conveying belt. The mounting system has a mounting assembly with a) a first connecting portion through which a cleaning blade can be joined to the mounting assembly and b) a mounting portion which can be attached to a support to maintain the mounting assembly in a desired operative position relative to a conveying belt that is to be cleaned so as to situate a cleaning belt joined to the mounting assembly in a first operative position. The mounting assembly has a second connecting portion that can be used in place of the first connecting portion and through which a cleaning blade can be joined to the mounting assembly so as to situate a cleaning blade joined to the mounting assembly in a second operative position.

34 Claims, 6 Drawing Sheets

UNIVERSAL MOUNT FOR A CLEANING BLADE FOR A CONVEYING BELT

BACKGROUND OF THE INVENTION

1. Field of the Invention

This invention relates to blades of the type used for cleaning conveying belts and, more particularly, to a mounting system for maintaining the cleaning blades selectively in a plurality of different mounting positions relative to a conveying belt.

2. Background Art

Conveying belts are used in a wide range of applications in many different environments. It is common to use cleaning blades in conjunction with conveying belts to scrape material that is adhered to the belts during the conveying process as the belts travel towards and through a return path portion.

An exemplary mounting system for cleaning blades is shown in U.S. Pat. No. 6,354,428, assigned to ASGCO Manufacturing, Inc. In U.S. Pat. No. 6,354,428, the mounting system includes a mounting assembly to which blades are releasably connected and having a mounting portion which is fixedly attached to a frame or other type of support associated with the conveying system. The configuration of the mounting assembly determines the location at which the blade contacts the belt and also the angle of attack for the blade.

Generally, different applications require different dimensions of mounting assembly. Even for the same conveying system, it may be desired to change the particular mounting orientation for the cleaning blade. Heretofore, it has been common to offer a number of different, fixed configuration, mounting assemblies which can be selectively purchased and installed to meet the desired application needs.

The concept of selectively using different mounting assemblies brings in the potential for a number of complications, from the standpoint of both the supplier and the end user. From the supplier's standpoint, a number of different mounting assemblies must be inventoried. Inventory control is predicated upon reasonable estimates of demand for a particular type of mounting assembly. It may be impossible to predict with any accuracy the demand for a particular mounting assembly. As a result, the supplier must either carry excess inventory or produce the mounting plates as demanded, which may produce an undesirable lag between the time orders are placed and filled. If the former occurs, the supplier is required to maintain extra inventory space and store and monitor the movement of inventory by mounting blade type.

From the standpoint of the end user, the purchase may be made of a particular mounting assembly type when in the end another mounting assembly better suits particular needs. Aside from the inconvenience, the end user may be required to purchase several different mounting assemblies and exchange one for the other as requirements dictate.

Designers of cleaning blade systems strive to afford blade mounting systems that meet a wide range of application needs, while at the same time minimizing the number of inventoried components.

SUMMARY OF THE INVENTION

In one form, the invention is directed to a mounting system for a cleaning blade for a conveying belt. The mounting system has a mounting assembly with a) a first connecting portion through which a cleaning blade can be joined to the mounting assembly and b) a mounting portion which can be attached to a support to maintain the mounting assembly in a desired operative position relative to a conveying belt that is to be cleaned so as to situate a cleaning blade joined to the mounting assembly in a first operative position. The mounting assembly has a second connecting portion that can be used in place of the first connecting portion and through which a cleaning blade can be joined to the mounting assembly so as to situate a cleaning blade joined to the mounting assembly in a second operative position.

In one form, the second connecting portion of the mounting assembly is accessible for joining to a cleaning blade by removing a part of the mounting assembly.

In one form, the first connecting portion has a first connecting element which can cooperate with a connecting element on a cleaning blade to maintain the cleaning blade in the first operative position and the second connecting portion has a second connecting element which can cooperate with a connecting element on the cleaning blade to maintain the cleaning blade in the second operative position.

The first connecting element may consist of a first projection which can be press fit into a receptacle on a cleaning blade.

In one form, the first connecting portion has a first edge which can be directed into a receiving space on a cleaning blade and the first projection is a discrete element which extends away from the first edge.

The second connecting portion may have a second edge which can be directed into a receiving space on a cleaning blade, with the second connecting portion having a second projection in the form of a discrete element which extends away from the second edge and can be directed into a receiving space on a cleaning blade.

In one form, the mounting assembly is a flat sheet and the first and second connecting portions have substantially flat first and second surface portions residing substantially within a single plane.

In one form, the second connecting portion of the mounting assembly is accessible for joining to a cleaning blade by removing a part of the mounting assembly from another part of the mounting assembly and the mounting assembly is cut to define the second connecting portion so that the part of the mounting assembly is integrally connected to the another part of the mounting assembly at a first location whereat the mounting assembly must be cut to separate the part of the mounting assembly from the another part of the mounting assembly.

The part of the mounting assembly may be integrally connected to the another part of the mounting assembly at a second location spaced from the first location whereat the mounting assembly must be cut to separate the part of the mounting assembly from the another part of the mounting assembly.

In one form, the first connecting element consists of a first receptacle into which a projection on a cleaning blade can be press fit.

The first connecting portion may include a first edge which can be directed into a receiving space on a cleaning blade, with the first receptacle being formed on the first edge.

The mounting assembly may have a locating notch at the first location to facilitate cutting of the mounting assembly to separate the part of the mounting assembly from the another part of the mounting assembly.

The mounting assembly may further include a third connecting portion that can be used in place of the first and second connecting portions and through which a cleaning blade can be joined to the mounting assembly so a to situate a cleaning blade joined to the mounting assembly in a third operative position.

The invention contemplates the mounting system in combination with a cleaning blade joined to the mounting assembly.

The combination may further include a conveying belt, wherein the cleaning blade is urged against the conveying belt.

The invention further contemplates the combination of a cleaning blade for a conveying belt and a mounting assembly, as set forth hereinabove.

The invention is further directed to a method of situating a cleaning blade in an operative position wherein the cleaning blade can be urged against a conveying belt. The method includes the step of: providing a mounting assembly with a first connecting portion through which the cleaning blade can be joined to the mounting assembly so as to situate the cleaning blade in a first operative position; and joining the cleaning blade to a second connecting portion on the mounting assembly so as to situate the cleaning blade in a second operative position.

The method may include the step of reconfiguring the mounting assembly to provide the second connecting portion.

The reconfiguration may involve removing a part of the mounting assembly to expose the second connecting portion on another part of the mounting assembly.

The second connecting portion may include a discrete connecting element at the edge. The method may further include the step of preforming at least a part of the discrete connecting element with the part and the another part of the mounting assembly integrally connected.

The step of preforming at least a part of the discrete element may involve cutting through the mounting assembly.

The cutting may be carried out through a laser beam or otherwise.

DETAILED DESCRIPTION OF THE DRAWINGS

Figure 1:
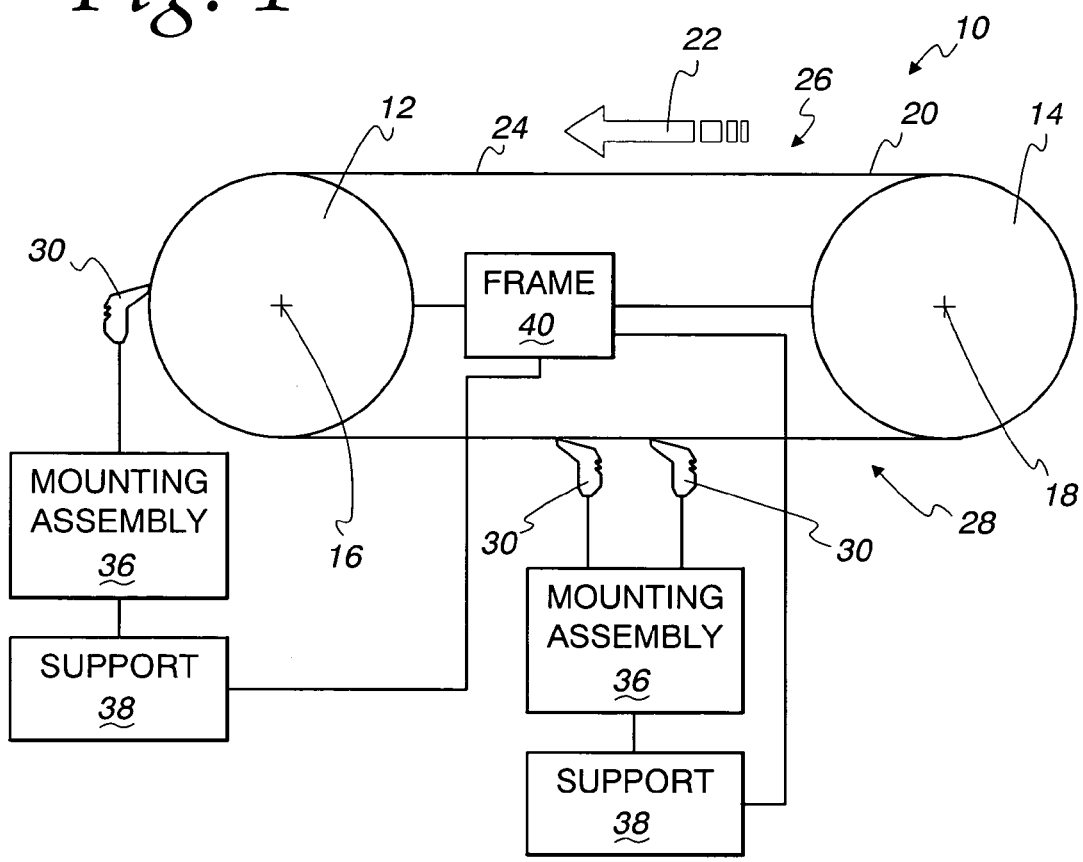
FIG. 1 is a partial schematic representation of a conveying system incorporating a plurality of cleaning blades, each mounted according to the present invention to a mounting assembly in an operative position relative to a conveying belt.

One form of conveying system, according to the present invention, is shown at 10 in FIG. 1. The conveying system 10 consists of head and tail rollers 12, 14, respectively, which are rotatable about substantially parallel axes 16, 18. A conveying belt 20 is trained around the rollers 12, 14 for movement in an endless path. The conveying belt 20 is driven in the path in the direction of the arrow 22. The conveying belt 20 has an outwardly facing surface 24 which faces upwardly in a conveying path portion at 26 and downwardly in a return path portion at 28. Conveying matter, not shown, is moved from right to left in FIG. 1 and discharges in the vicinity of the head roller 12. A primary cleaning blade 30 acts against the belt 20 at a location where it overlies the head roller 12 to scrape any material that is adhered to the conveying belt surface 24. In the return path portion, the conveying belt surface 24 is operated upon by one, or a plurality of, cleaning blades 30, referred to as doctor blades. The precise configuration of the doctor blades 30 is not key to the present invention.

Each cleaning blade 30 is maintained in an operative position by a mounting assembly 36 relative to a support 38. The supports 38 may be independent structures or integral with a frame 40 upon which the components of the conveying system 10 are mounted.

It should be understood that the conveying system 10 disclosed is intended only to be exemplary in nature. The inventive structure can be incorporated into virtually any type of conveying system in which cleaning blades are incorporated, either to perform a primary cleaning function or to function as doctor blades. Further, the invention contemplates blades that have widths equal to or less than the width of the conveying belt surface 24. For example, in some applications a single cleaning blade extends across the entire widthwise dimension of the conveying belt 20. Alternatively, a series of the cleaning blades can be placed side-by-side across the width dimension of the conveying belt surface 24. As a still further alternative, the cleaning blades may be staggered at lengthwise positions along the conveying belt surface 24.

Referring now to FIGS. 2–8, the details of one form of mounting assembly 36 and cleaning blade 30 are shown. The mounting assembly 36 consists of a generally flat body 42 with an angled, generally flat, mounting portion 44. The flat body 42 defines a series of, in this case three, connecting portions 46, 48, 50, as hereinafter described. The mounting portion 44 has four through bores 52, 54, 56, 58 which accept threaded fasteners 60 (one shown) which releasably maintain the mounting portion 44 attached to the support 38. The angle α between the body 42 and connecting portion 46 determines the angle of attack for a distal cleaning edge 62 on the attached cleaning blade 30.

The cleaning blade 30 has a body 64 which defines a blind receiving space 66 within which the body 42, and more particularly the connecting portion 46, can be directed. The blade 30 has a male connecting element 68 within the receiving space 66 which cooperates with a female connecting element 70 on the mounting portion 46. The male connecting element 68 has an enlarged, rounded head 72 on a stem 74. The female connecting element 70 consists of a generally V-shaped edge 75 which extends through a free edge 76 of the connecting portion 46. The edge 75 consists of two edge portions 78, 80, which converge to a rounded opening 81 and towards a curved byte portion 82.

To join the cleaning blade 30 to the mounting assembly 36, the mounting portion 44 is directed into the receiving space 66. The width W of the receiving space 66 may be slightly greater than the corresponding width W1 of the connecting portion 46. As the connecting portion 46 is moved into the receiving space 66, the head 72 is guided by the edge portions 78, 80 toward the byte portion 82, and into the opening 81, which has a shape that is complementary to that of the head 72. The female connecting element 70 has a restriction at 84 at the juncture of the edges 78, 80 and opening 81. The head 72 must be squeezed and compressed to pass through this restriction 84. Preferably, the entire blade 30, including the head 72, is made from a resilient material, such as urethane, which allows the head 72 to deform and pass through the restriction 84 and thereafter assume a substantially undeformed state. Through this arrangement, the head 72 releasably locks within the opening 81. The curved head 72 and opening 81 allow a modicum of relative pivoting between the blade 30 and body 42 about the axis 86 of the head 72. This allows the blade 30 to adjust slightly relative to the mounting assembly 36 during operation. The distal blade edge 62 can thus be maintained in intimate contact with the conveying blade surface 24 along substantially its entire length.

Figure 9:
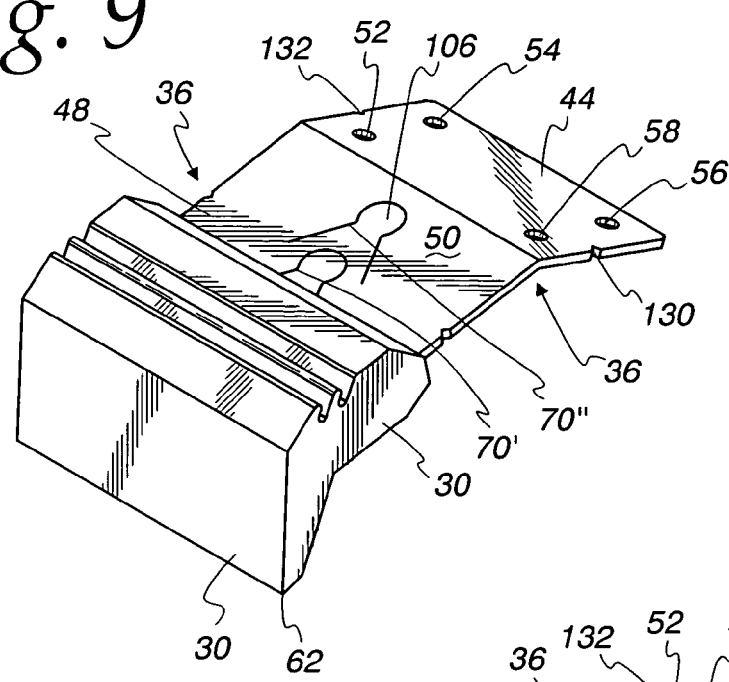
FIG. 9 is a top perspective view of the cleaning blade and mounting assembly of FIG. 2 in joined relationship.

With the cleaning blade 30 joined to the mounting assembly 36 through the connecting portion 46, the blade 30 and mounting assembly 36 have a configuration as shown in FIG. 9. With this arrangement, with the mounting portion 44 attached to the support 38, the cleaning blade 30 is situated in a first operative position relative to the conveying blade surface 24 at either the primary or secondary cleaning positions.

The body 42 is cut, as through a laser beam generated by a laser generator 88, to define a second female connecting element 70', having the same configuration as the first female connecting element 70 and consisting of edge portions 78', 80' converging to an opening 81' and towards a byte portion 82'. Before being cut, the connecting portions 46, 48 remain integrally attached at first and second spaced locations 90, 92 between the connecting portions 46, 48 on opposite sides of the connecting element 70'. The integral connection is sufficient that the presence of the pre-cut female connecting element 70' will not appreciably diminish the integrity of the mounting assembly 36 so that the mounting assembly 36 will not fail with the blade 30 joined to the connecting portion 46 and operated under normal conditions.

Figure 10:
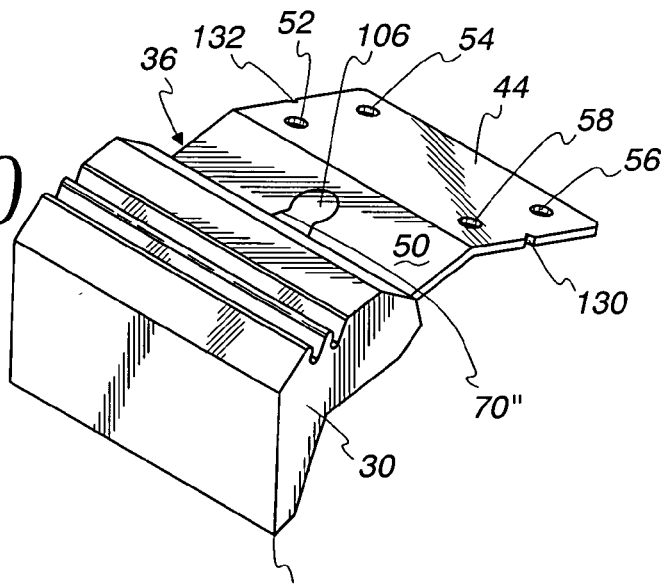
FIG. 10 is a view as in FIG. 9 with the mounting assembly changed to a second configuration.
Figure 11:
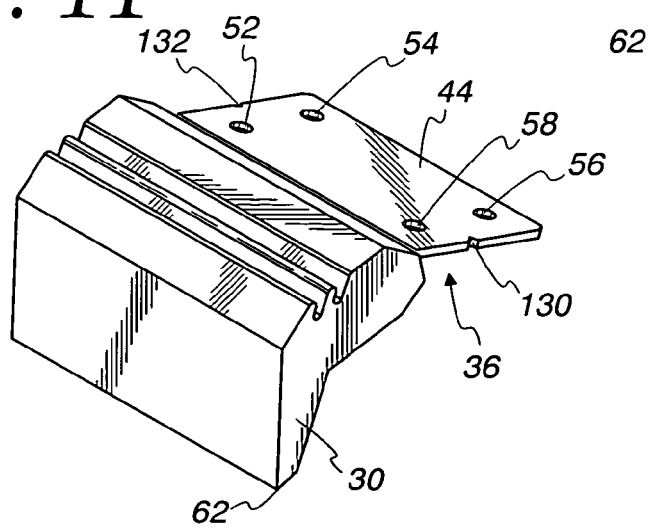
FIG. 11 is a view as in FIGS. 9 and 10 with the mounting assembly changed to a third configuration.

According to the invention, the mounting assembly 36 can be reconfigured, as shown in FIG. 10, as for use on a different piece of equipment or when a different angle of attack for the blade 30 is desired. To effect this reconfiguration, the body 42 is cut along the line L to produce an exposed edge 76' at that line. The female connecting element 70' thereby becomes exposed at the edge 76' identically as the female cutting element 70 is exposed at the edge 76. By cutting along the line L, as through the laser generator 88, the body 42 at the first and second locations 90, 92 is severed up to the edge portions 78', 80'. As a result, the part of the body 42, which includes the connecting portion 46 and the integrally connected portion at 97 within the female connector element 70', are separated from the remainder of the body 42. In effect, the length L1 of the body 42 becomes reduced by an increment, as dictated by the dimension L2 of the removed part between the existing edge 76 and newly formed edge 76'. With the body part removed, the remaining portion of the mounting assembly 36 functions, in the same manner in cooperation with the blade 30 in connecting thereto, to produce the configuration show in FIG. 10.

To facilitate cutting of the body 42 at the first and second locations 90, 92, locating notches 98, 100, each in a generally "V" shape, are formed through the edges 102, 104 of the body 42, with the apex of each "V" being aligned with the cut line L.

While a generator 88 is shown to produce a laser to effect the cutting, cuffing could be carried out by other conventional means. Still further, the body 42 at the first and second locations 90, 92 may be perforate between the notches 98, 100, which permits the removed part to be effectively snapped off of the remaining portion of the body 42.

The different configuration of the mounting assembly 36 in FIG. 10 might be desired for use with a different support configuration, for use in a different environment, and/or to produce a different angle of attack with respect to the conveying belt 20.

Any number of parts may be removable from the body 42 to produce a desired configuration thereof. In the embodiment shown, the connecting portion 48 is similarly selectively separable as one piece with the portion 106 within a third female connecting element 70", to allow the remaining portion of the mounting assembly 36 to be utilized in the same fashion to produce the joined configuration of mounting assembly 36 and blade 30 shown in FIG. 12. This separation occurs along a line L3 to produce a free edge 76", corresponding to the free edges 76, 76', with the female connecting element 70" extending therethrough. Locating notches 110, 112 are formed through the edges 102, 104 to facilitate cutting along the line L2.

The reconfiguration of the mounting assembly 36 can occur at either the point of manufacture or on site. It is possible to sell each mounting assembly 36 as a kit with a single blade 30 and allow the end use to select the desired reconfiguration. Alternatively, a supplier can reconfigure the mounting assembly 36 on an order-by-order basis.

Figure 2:
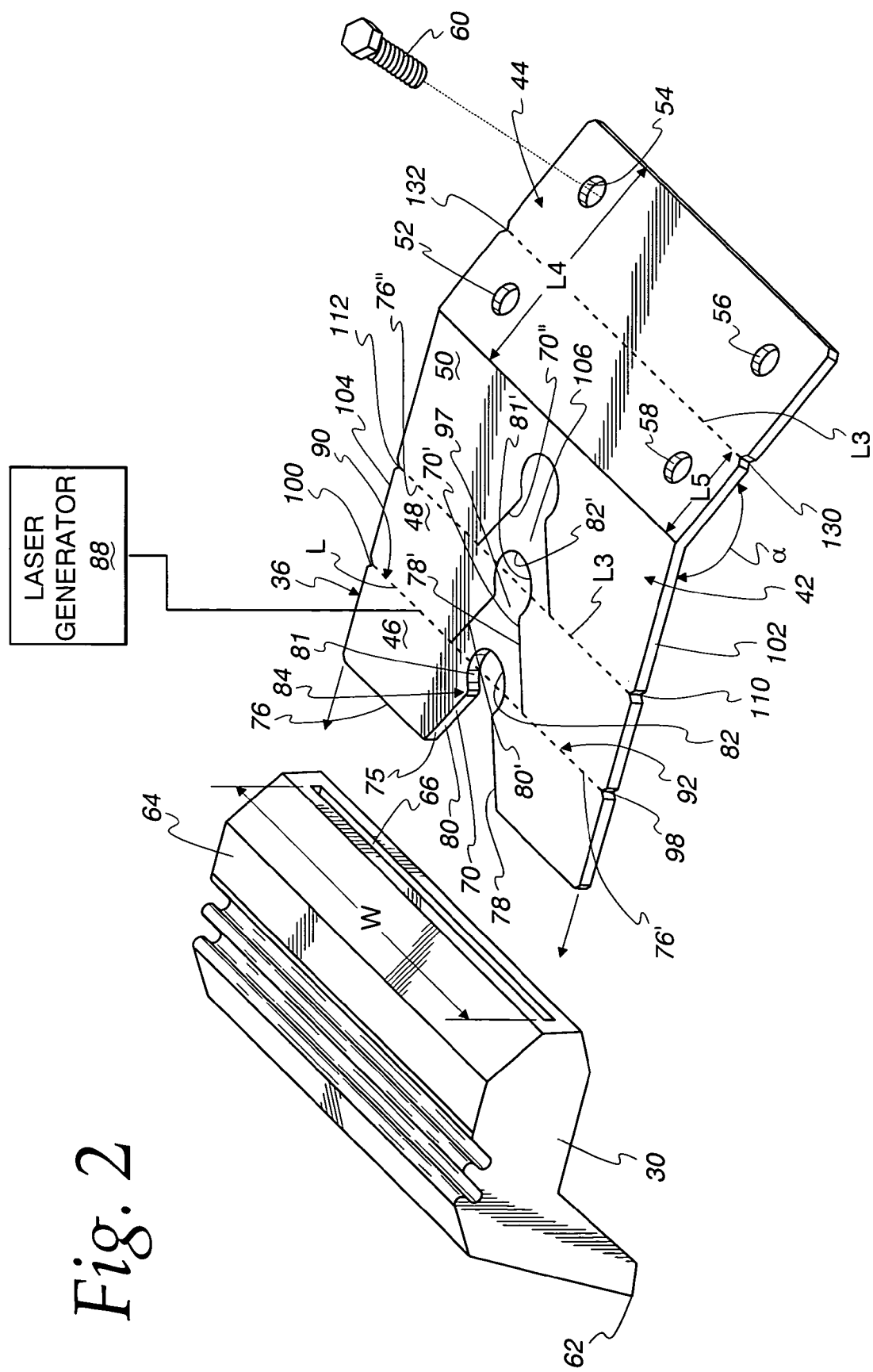
FIG. 2 is an exploded, perspective view of one of the mounting assemblies in relationship to one of the blades and with the mounting assembly in a first configuration.
Figure 3:
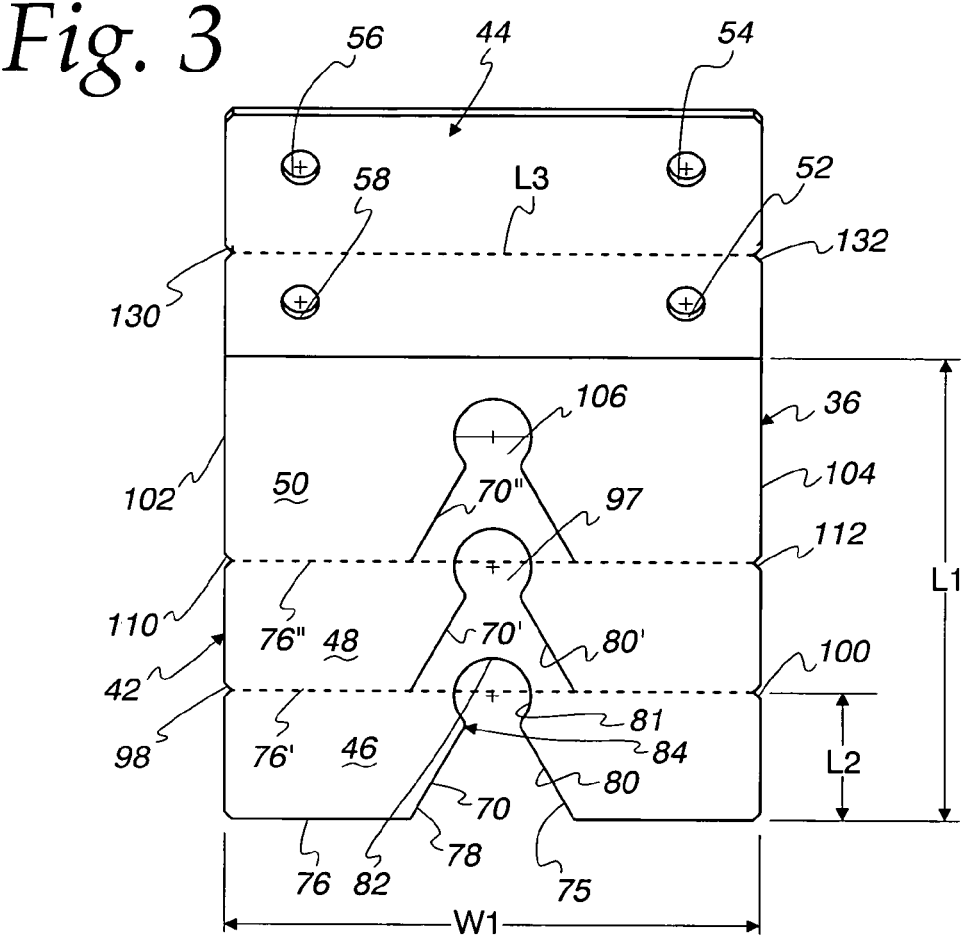
FIG. 3 is a rear elevation view of the mounting assembly of FIG. 2.
Figure 4:
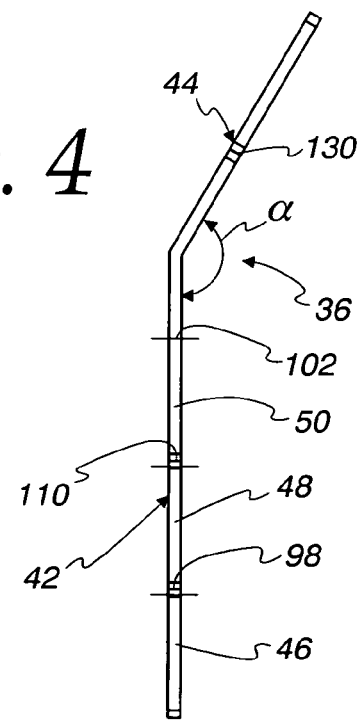
FIG. 4 is a side elevation view of the mounting assembly in FIGS. 2 and 3.
Figure 5:
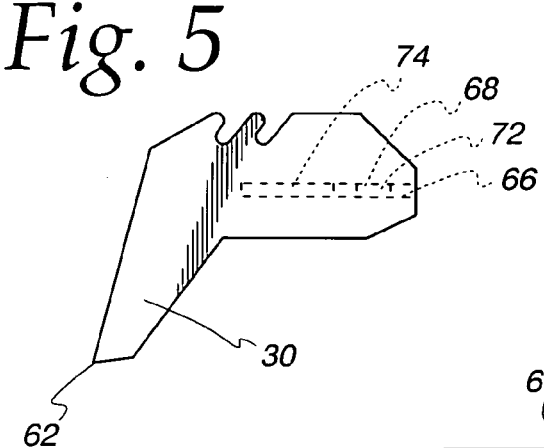
FIG. 5 is a side elevation view of the cleaning blade of FIG. 2.
Figure 6:
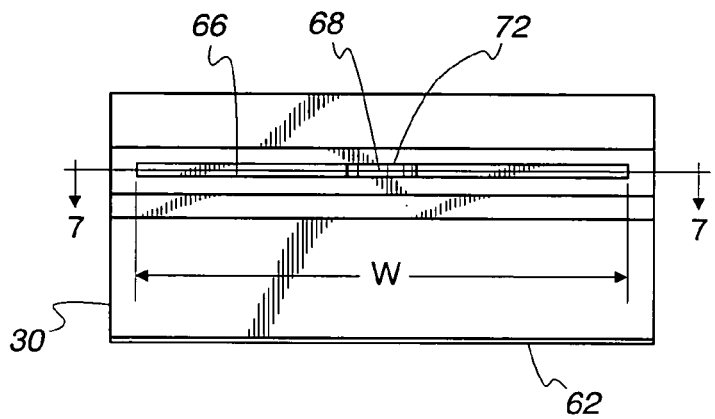
FIG. 6 is a bottom view of the cleaning blade in FIGS. 2 and 5.
Figure 7:
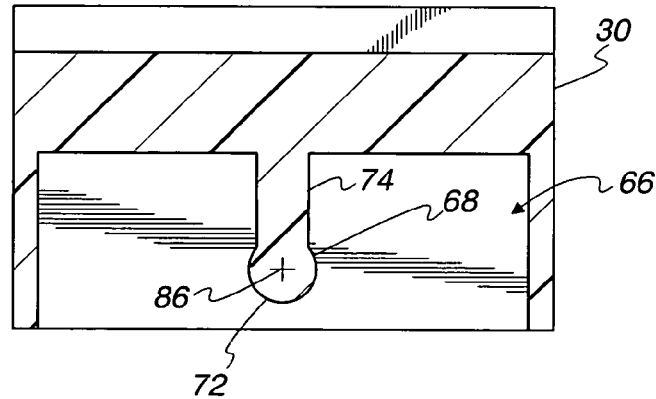
FIG. 7 is an enlarged, cross-sectional view of the cleaning blade taken along line 7—7 of FIG. 6.
Figure 8:
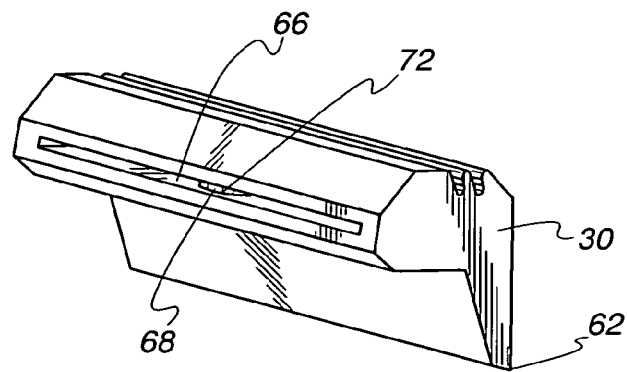
FIG. 8 is a bottom perspective view of the cleaning blade in FIGS. 2 and 5–7.
Figure 13:
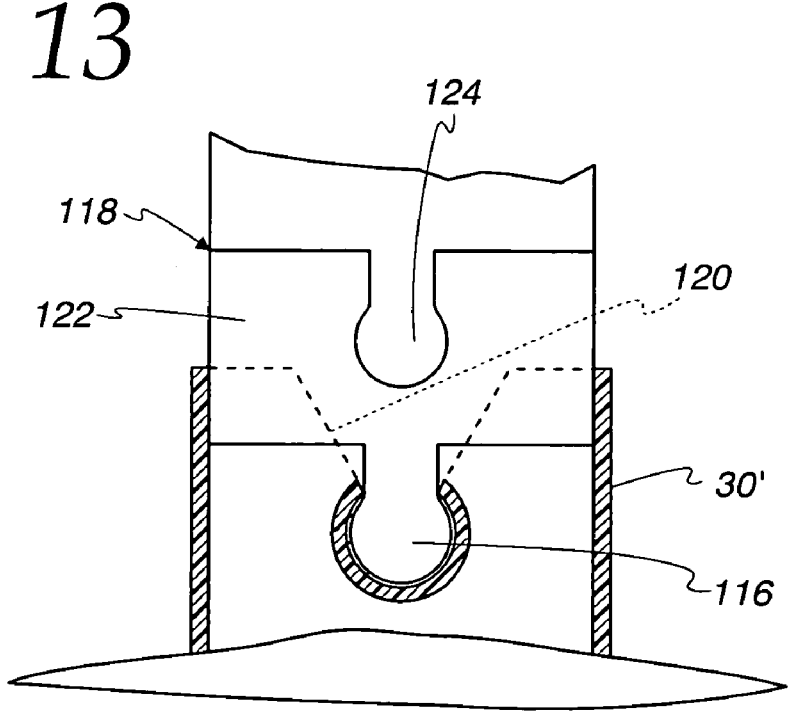
FIG. 13 is a partial cross-sectional view of a modified form of cooperating connecting elements between a cleaning blade and mounting assembly, according to the present invention.

While the male connecting element 68 has been shown on the blade 30, a correspondingly configured male element 116 may be provided on a mounting assembly 118, shown in FIG. 13, corresponding to the mounting assemblies 36, shown for example in FIG. 2. A correspondingly configured female connecting element 120 may be provided in a blade 30', corresponding to the blade 30, previously described. A part 122 of the mounting assembly 118 may be removed from the mounting assembly 118 to expose a second male element 124, corresponding in shape and function to the male element 116.

Figure 12:
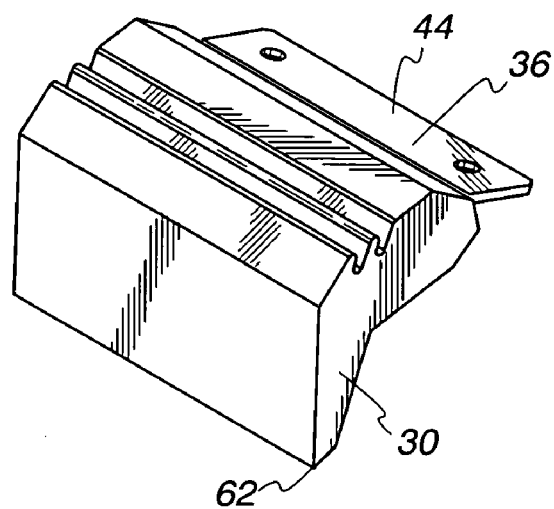
FIG. 12 is a view as in FIG. 1 with the mounting portion of the mounting assembly reconfigured.

The invention also contemplates that the mounting portion 44 of the mounting assembly 36 might be severed along a line L3, as shown in FIG. 2, to reduce the length dimension L4 of the mounting portion 44 to the dimension L5, to produce a mounting assembly 36 having the configuration shown in FIG. 12. Again notches 130, 132 on the edges 102, 104 can be provided to facilitate cutting, by means of a laser beam or using other means known to those skilled in the art.

The foregoing disclosure of specific embodiments is intended to be illustrative of the broad concepts comprehended by the invention.

What is claimed is:

1. A mounting system for a cleaning blade for a conveying belt having a widthwise extent, the mounting system comprising:

a mounting assembly having a) a first connecting portion through which a cleaning blade can be joined to the mounting assembly and b) a mounting portion which can be attached to a support to maintain the mounting assembly in a desired operative position at a first widthwise location relative to a conveying belt that is to be cleaned so as to situate a cleaning blade joined to the mounting assembly in a first operative position, the mounting assembly having a second connecting portion that is at least partially formed on the mounting assembly and is made accessible for use by reconfiguring a part of the mounting assembly and used in place of the first connecting portion through which a cleaning blade can be joined to the mounting assembly so as to situate a cleaning blade joined to the mounting assembly in a second operative position substantially at the first widthwise location.

2. The mounting system according to claim 1 wherein the second connecting portion of the mounting assembly is made accessible for joining to a cleaning blade by removing a part of the mounting assembly.

3. The mounting system according to claim 2 wherein the first connecting portion comprises a first connecting element which can cooperate with a connecting element on a cleaning blade to maintain a cleaning blade in the first operative position and the second connecting portion comprises a second connecting element which can cooperate with a connecting element on a cleaning blade to maintain a cleaning blade in the second operative position.

4. The mounting system according to claim 1 wherein the first connecting element comprises a first projection which can be press fit into a receptacle on a cleaning blade.

5. The mounting system according to claim 4 wherein the first connecting portion comprises a first edge which can be directed into a receiving space on a cleaning blade and the first projection comprises a discrete element which extends away from the first edge.

6. The mounting system according to claim 5 wherein the second connecting portion comprises a second edge which can be directed into a receiving space on a cleaning blade and the second connecting portion comprises a second projection comprising a discrete element which extends away from the second edge and can be directed into a receiving space on a cleaning blade.

7. The mounting system according to claim 2 wherein the mounting assembly comprises a flat sheet and the first and second connecting portions have substantially flat first and second surface portions residing substantially within a single plane.

8. A mounting system for a cleaning blade for a conveying belt having a widthwise extent, the mounting system comprising:

a mounting assembly having a) a first connecting portion through which a cleaning blade can be joined to the mounting assembly and b) a mounting portion which can be attached to a support to maintain the mounting assembly in a desired operative position relative to a conveying belt that is to be cleaned so as to situate a cleaning blade joined to the mounting assembly in a first operative position, the mounting assembly having a second connecting portion that is at least partially formed on the mounting assembly and accessible for use by reconfiguring a part of the mounting assembly and used in place of the first connecting portion through which a cleaning blade can be joined to the mounting assembly so as to situate a cleaning blade joined to the mounting assembly in a second operative position substantially at the first widthwise location, wherein the first connecting element comprises a first projection which can be press fit into a receptacle on a cleaning blade, wherein the first connecting portion comprises a first edge which can be directed into a receiving space on a cleaning blade and the first projection comprises a discrete element which extends away from the first edge, wherein the second connecting portion comprises a second edge which can be directed into a receiving space on a cleaning blade and the second connecting portion comprises a second projection comprising a discrete element which extends away from the second edge and can be directed into a receiving space on a cleaning blade, wherein the second connecting portion of the mounting assembly is accessible for joining to a cleaning blade by removing a part of the mounting assembly from another part of the mounting assembly, and the mounting assembly is cut to define the second connecting portion and so that the part of the mounting assembly is integrally connected to the another part of the mounting assembly at a first location whereat the mounting assembly must be cut to separate the part of the mounting assembly from the another part of the mounting assembly.

9. The mounting system according to claim 8 wherein the part of the mounting assembly is integrally connected to the another part of the mounting assembly at a second location spaced from the first location whereat the mounting assembly must be cut to separate the part of the mounting assembly from the another part of the mounting assembly.

10. A mounting system for a cleaning blade for a conveying belt having a widthwise extent, the mounting system comprising:

a mounting assembly having a) a first connecting portion through which a cleaning blade can be joined to the mounting assembly and b) a mounting portion which can be attached to a support to maintain the mounting assembly in a desired operative position relative to a conveying belt that is to be cleaned so as to situate a cleaning blade joined to the mounting assembly in a first operative position, the mounting assembly having a second connecting portion that is at least partially formed on the mounting assembly and accessible for use by reconfiguring a part of the mounting assembly and used in place of the first connecting portion through which a cleaning blade can be joined to the mounting assembly so as to situate a cleaning blade joined to the mounting assembly in a second operative position substantially at the first widthwise location, wherein the first connecting portion comprises a first receptacle into which a projection on a cleaning blade can be press fit.

11. The mounting system according to claim 10 wherein the first connecting portion comprises a first edge which can be directed into a receiving space on a cleaning blade and the first receptacle is formed on the first edge.

12. The mounting system according to claim 8 wherein the mounting assembly has a locating notch at the first location to facilitate cutting of the mounting assembly to separate the part of the mounting assembly from the another part of the mounting assembly.

13. The mounting system according to claim 1 wherein the mounting assembly further comprises a third connecting portion that can be used in place of the first and second connecting portions and through which a cleaning blade can be joined to the mounting assembly so as to situate a cleaning blade joined to the mounting assembly in a third operative position.

14. The mounting system according to claim 1 in combination with a cleaning blade joined to the mounting assembly.

15. The mounting system according to claim 14 further in combination with a conveying belt wherein the cleaning blade is urged against the conveying belt.

16. In combination:
a) a cleaning blade for a conveying belt having a widthwise extent; and
b) a mounting assembly having i) a first connecting portion through which the cleaning blade can be joined to the mounting assembly and ii) a mounting portion which can be attached to a support to maintain the mounting assembly in a desired operative position at a first widthwise location relative to a conveying belt that is to be cleaned so as to situate the cleaning blade in a first operative position,
the mounting assembly having a second connecting portion that is at least partially formed on the mounting assembly and accessed for use by reconfiguring a part of the mounting assembly and used in place of the first connecting portion through which the cleaning blade can be joined to the mounting assembly so as to situate the cleaning blade in a second operative position substantially at the first widthwise location.

17. The combination according to claim 16 wherein the second connecting portion of the mounting assembly is accessible for joining to the cleaning blade by removing a part of the mounting assembly.

18. The combination according to claim 17 wherein the first connecting portion comprises a first connecting element which can cooperate with a connecting element on the cleaning blade to maintain the cleaning blade in the first operative position and the second connecting portion comprises a second connecting element which can cooperate with the connecting element on the cleaning blade to maintain the cleaning blade in the second operative position.

19. The combination according to claim 16 wherein the first connecting element comprises a first projection which can be press fit into a receptacle on the cleaning blade.

20. The combination according to claim 19 wherein the first connecting portion comprises a first edge which can be directed into a receiving space on the cleaning blade and the first projection comprises a discrete element which extends away from the first edge.

21. The combination according to claim 20 wherein the second connecting portion comprises a second edge which can be directed into a receiving space on the cleaning blade and the second connecting portion comprises a second projection comprising a discrete element which extends away from the second edge and can be directed into the receiving space on the cleaning blade.

22. The combination according to claim 17 wherein the mounting assembly comprises a flat sheet and the first and second connecting portions have substantially flat first and second surface portions residing substantially within a single plane.

23. In combination:
a) a cleaning blade for a conveying belt having a widthwise extent; and
b) a mounting assembly having i) a first connecting portion through which the cleaning blade can be joined to the mounting assembly at a first location and ii) a mounting portion which can be attached to a support to maintain the mounting assembly in a desired operative position at a first widthwise location relative to a conveying belt that is to be cleaned so as to situate the cleaning blade in a first operative position,
the mounting assembly having a second connecting portion that is at least partially formed on the mounting assembly and can be accessed for use by reconfiguring a part of the mounting assembly and used in place of the first connecting portion through which the cleaning blade can be joined to the mounting assembly so as to situate the cleaning blade in a second operative position substantially at the first widthwise location,
wherein the first connecting element comprises a first projection which can be press fit into a receptacle on the cleaning blade,
wherein the first connecting portion comprises a first edge which can be directed into a receiving space on the cleaning blade and the first projection comprises a discrete element which extends away from the first edge,
wherein the second connecting portion comprises a second edge which can be directed into a receiving space on the cleaning blade and the second connecting portion comprises a second projection comprising a discrete element which extends away from the second edge and can be directed into the receiving space on the cleaning blade,
wherein the second connecting portion of the mounting assembly is reconfigured by removing a part of the mounting assembly from another part of the mounting assembly, and the mounting assembly is cut to define the second connecting portion and so that the part of the mounting assembly is integrally connected to the another part of the mounting assembly at a first location whereat the mounting assembly must be cut to separate the part of the mounting assembly from the another part of the mounting assembly.

24. The combination according to claim 23 wherein the part of the mounting assembly is integrally connected to the another part of the mounting assembly at a second location spaced from the first location whereat the mounting assembly must be cut to separate the part of the mounting assembly from the another part of the mounting assembly.

25. The combination according to claim 16 wherein the cleaning blade comprises a projection and the first connecting portion comprises a first receptacle into which the projection on the cleaning blade can be press fit.

26. The combination according to claim 25 wherein the first connecting portion comprises a first edge which can be directed into a receiving space on the cleaning blade and the first receptacle is formed in the first edge.

27. The combination according to claim 23 wherein the mounting assembly has a locating notch at the first location to facilitate cutting of the mounting assembly to separate the part of the mounting assembly from the another part of the mounting assembly.

28. The mounting system according to claim 1 wherein the mounting assembly further comprises a third connecting portion that can be used in place of the first and second connecting portions and through which the cleaning blade can be joined to the mounting assembly so as to situate the cleaning blade joined to the mounting assembly in a third operative position.

29. The combination according to claim 16 further in combination with a conveying belt wherein the cleaning blade is urged against the conveying belt.

30. A method of situating a cleaning blade in an operative position wherein the cleaning blade can be urged against a conveying belt, the conveying belt having a widthwise extent, the method comprising the steps of:
   providing a mounting assembly with a first connecting portion through which the cleaning blade can be joined to the mounting assembly so as to situate the cleaning blade in a first operative position of a first widthwise location;
   reconfiguring the mounting assembly; and
   after reconfiguring the mounting assembly, joining the cleaning blade to a second connecting portion on the mounting assembly so as to situate the cleaning blade in a second operative position substantially at the first widthwise location.

31. A method of situating a cleaning blade in an operative position wherein the cleaning blade can be urged against a conveying belt having a widthwise extent, the method comprising the steps of:
   providing a mounting assembly with a first connecting portion through which the cleaning blade can be joined to the mounting assembly so as to situate the cleaning blade in a first operative position at a first widthwise location;
   joining the cleaning blade to a second connecting portion on the mounting assembly so as to situate the cleaning blade in a second operative position substantially at the first widthwise location, and
   reconfiguring the mounting assembly to provide the second connecting portion,
   wherein the step of reconfiguring the mounting assembly comprises removing a part of the mounting assembly to expose the second connecting portion on another part of the mounting assembly.

32. The method of situating a cleaning blade in an operative position according to claim 31 wherein the second connecting portion comprises an edge with a discrete connecting element at the edge and further comprises the step of preforming at least a part of the discrete connecting element with the part and the another part of the mounting assembly integrally connected.

33. The method of situating a cleaning blade in an operative position according to claim 32 wherein the step of preforming at least a part of the discrete element comprises cutting through the mounting assembly.

34. The method of situating a cleaning blade in an operative position according to claim 32 wherein the step of preforming the discrete element comprises cutting through the mounting assembly using a laser beam.

* * * * *